United States Patent [19]

Matsuda et al.

[11] Patent Number: 5,291,675
[45] Date of Patent: Mar. 8, 1994

[54] FLUID PRESSURE CONTROL SYSTEM WITH AN ACCUMULATOR RESPONSIVE TO A LOSS OF SYSTEM PRESSURE

[75] Inventors: Shohei Matsuda; Kazutoshi Tashima; Yoshihiro Urai, all of Wako; Makoto Horiuchi; Ryuji Horiuchi, both of Ueda, all of Japan

[73] Assignees: Honda Giken Kogyo Kabushiki Kaisha, Tokyo; Nissin Kogyo Co., Ltd., Ueda, both of Japan

[21] Appl. No.: 973,234

[22] Filed: Nov. 10, 1992

[30] Foreign Application Priority Data

Nov. 12, 1991 [JP] Japan .................. 3-295928
Jan. 20, 1992 [JP] Japan .................. 4-007518

[51] Int. Cl.$^5$ .............. F16D 31/02; B60T 13/16; B60T 8/40
[52] U.S. Cl. ........................ 60/413; 303/10; 303/116.1; 303/115.4
[58] Field of Search ............ 60/413; 303/10, 115.4, 303/115.5, 116.1, 116.4

[56] References Cited

U.S. PATENT DOCUMENTS

| 3,666,328 | 5/1972 | Williams | 303/10 X |
| 4,187,682 | 2/1980 | Shen | 60/413 |
| 4,555,145 | 11/1985 | Maehara et al. | 303/115.4 X |
| 4,995,677 | 2/1991 | Matsuda et al. | 303/115.5 |

FOREIGN PATENT DOCUMENTS

| 151566 | 6/1988 | Japan | 303/115.4 |
| 2185796 | 7/1987 | United Kingdom | 303/115.4 |

Primary Examiner—Edward K. Look
Assistant Examiner—John Ryznic
Attorney, Agent, or Firm—Armstrong, Westerman, Hattori, McLeland & Naughton

[57] ABSTRACT

A fluid pressure control system which includes an operational reaction force generating device having a piston which includes a front surface facing a pressure chamber and is operatively connected to an operating member so as to reduce a volume of the pressure chamber in response to the operation of the operating member. The fluid pressure control system further includes a fluid pressure control valve capable of adjusting and outputting an output pressure from a fluid pressure supply source capable of outputting a constant fluid pressure in accordance with the operation amount of the operating member and a stroke accumulator connected to the pressure chamber. The stroke accumulator is of a structural arrangement such that the resilient biasing force acting on the accumulator piston by the movement of the back-up piston toward the accumulator piston with the abnormal reduction in fluid pressure in the pilot chamber connected to the fluid pressure supply source is increased more than the fluid pressure acting on the accumulator piston when the fluid pressure in the pilot chamber is normal. Thus, it is possible in the fluid pressure control system of this invention to prevent the amount in which the operating member operates from being increased more than necessary when the output fluid pressure from the fluid pressure supply source is abnormally reduced.

7 Claims, 10 Drawing Sheets

5,291,675

FLUID PRESSURE CONTROL SYSTEM WITH AN ACCUMULATOR RESPONSIVE TO A LOSS OF SYSTEM PRESSURE

BACKGROUND OF THE INVENTION

1. Field of the Invention

The present invention generally relates to a fluid pressure control system comprising an operational reaction force generating means having a piston which includes a front surface facing a pressure chamber and which is operatively connected to an operating member to reduce a volume of the pressure chamber in response to the operation of the operating member; a hydraulic pressure control valve capable of adjusting and outputting an output pressure from a fluid pressure supply source capable of outputting a constant fluid pressure in accordance with the operation amount of the operating member, and a stroke accumulator connected to the pressure chamber.

2. Discussion of the Relevant Art

Such fluid pressure control systems are conventionally known from, for example, Japanese Patent Application Laid-open Nos.244956/89, 175361 90, and 299966/90.

In the above conventional systems, when the output pressure from the fluid pressure supply source is normal, a fluid pressure produced in the pressure chamber by the operation of the operating member is accumulated in the stroke accumulator and acts as an operational reaction, and the fluid pressure control valve is operated in accordance with the operation amount of the operating member to adjust the output pressure from the fluid pressure supply source to a fluid pressure corresponding to the operation amount of the operating member in order to deliver the adjusted fluid pressure. If the output pressure from the fluid pressure supply source is abnormally reduced for any reason, the fluid pressure produced in the pressure chamber is delivered. However, when the output pressure from the fluid pressure supply source is abnormally reduced, the fluid pressure produced in the pressure chamber is consumed more than necessary in the stroke accumulator, resulting in a need to largely operate the operating member.

SUMMARY OF THE INVENTION

Accordingly, it is an object of the present invention to provide a fluid pressure control system, wherein when output pressure from the fluid pressure supply source is abnormally reduced, the fluid pressure consumed in the stroke accumulator is reduced; thereby, preventing the operation amount required for the operating member from being increased.

In order to achieve the above object, according to the present invention, there is provided a fluid pressure control system comprising an operational reaction force generating means having a piston which includes a front surface facing a pressure chamber and which is operatively connected to an operating member to reduce a volume of the pressure chamber in response to the operation of the operating member; a fluid pressure control valve capable of adjusting and outputting an output pressure from a fluid pressure supply source capable of outputting a constant fluid pressure in accordance with the operation amount of the operating member; and a stroke accumulator connected to the pressure chamber. The stroke accumulator comprises a casing, an accumulator piston slidably received in the casing to define an accumulating chamber leading to the pressure chamber between the accumulator piston and the casing, and a back-up piston slidably received in the casing to define a pilot chamber leading to the fluid pressure supply source between the back-up piston and the casing such that a movement of the back-up piston in a direction to reduce a volume of the pilot chamber corresponds to a movement of the back-up piston toward the accumulator piston. The stroke accumulator further includes a first biasing means for resiliently biasing the accumulator piston in a direction to reduce a volume of the accumulating chamber. The stroke accumulator also includes a second biasing means having a larger load than that of the first biasing means for resiliently biasing the back-up piston in a direction to reduce the volume of the pilot chamber. The resilient biasing force acting on the accumulator piston by the movement of the back-up piston toward the accumulator piston with the abnormal reduction in fluid pressure in the pilot chamber is increased more than the resilient biasing force acting on the accumulator piston when the fluid pressure in the pilot chamber is normal.

With the above construction of the present invention, the resilient biasing force acting on the accumulator piston is increased more than the biasing force that acts on the accumulator piston when the fluid pressure in the pilot chamber is normal as a result of the movement of the back-up piston toward the accumulator piston with the abnormal reduction in fluid pressure in the pilot chamber. Therefore, when the output fluid pressure from the fluid pressure supply source is abnormally reduced, a more than necessary amount of fluid pressure produced in the pressure chamber that is consumed is avoided. Consequently, the operation stroke of the operating member is prevented from being increased more than necessary.

The above and other objects, features and advantages of the invention will become apparent from the following description of preferred embodiments, taken in conjunction with the accompanying drawings.

BRIEF DESCRIPTION OF THE DRAWINGS

FIGS. 1 to 7 illustrate a first embodiment of the present invention, wherein

FIG. 1 is a diagram of a fluid pressure circuit in a braking pressure control system;

FIG. 2 is a longitudinal sectional view illustrating the construction of a fluid pressure transfer unit;

FIG. 3 is a longitudinal sectional view illustrating the construction of a flow communication restraining unit;

FIG. 4 is a longitudinal sectional view illustrating the construction of a portion of a control fluid pressure output unit; FIG. 5 is a longitudinal sectional view illustrating the construction of the remaining portion of the control fluid pressure output unit;

FIG. 6 is longitudinal sectional view illustrating the construction of a stroke accumulator;

FIG. 7 is a graph illustrating a relationship between the stroke of an input piston and the spring reaction in an auxiliary fluid pressure generating means;

DESCRIPTION OF THE PREFERRED EMBODIMENTS

Figure 1:
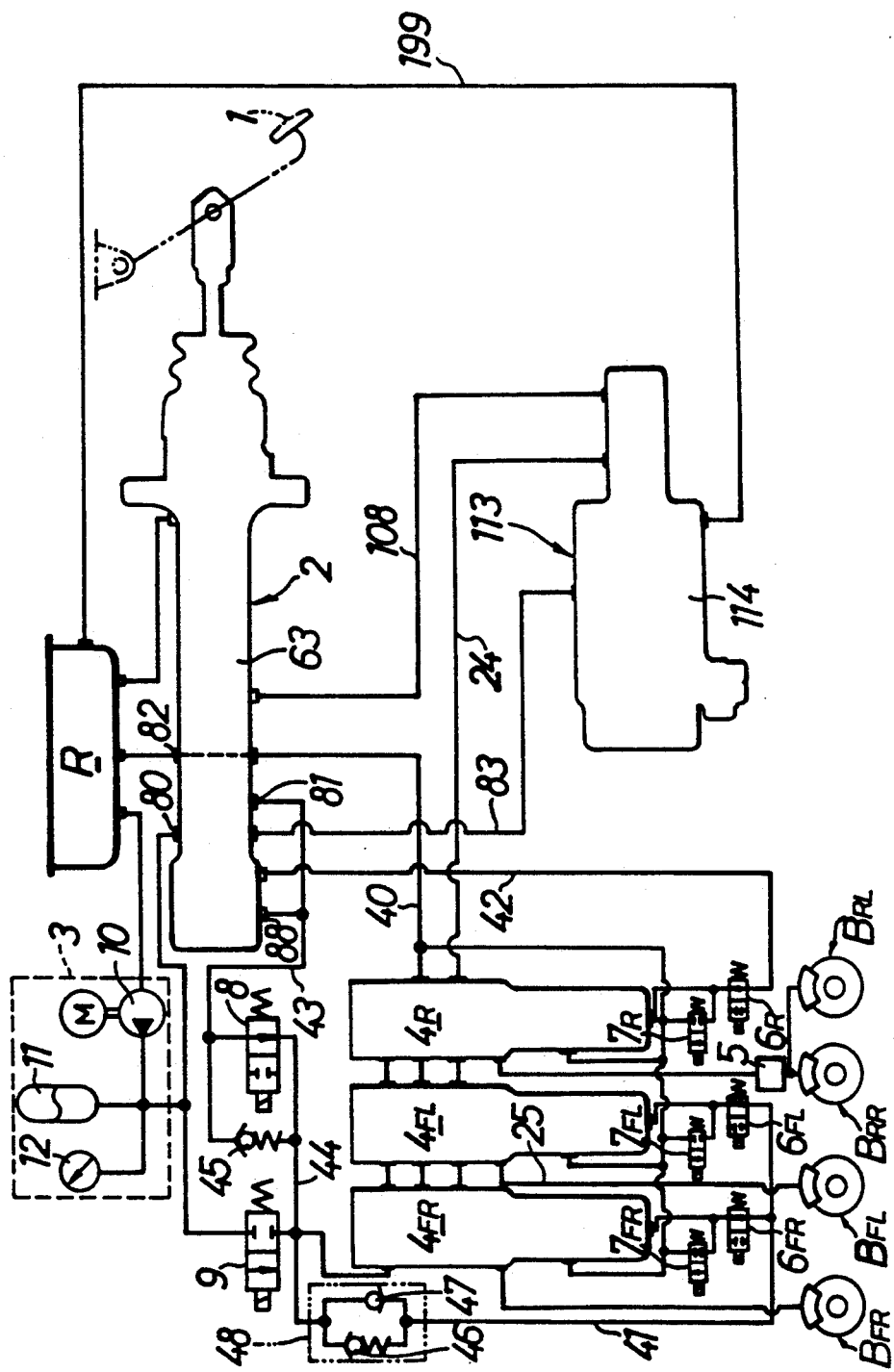

Referring first to FIG. 1, a left front wheel brake device $B_{FL}$ and a right front wheel brake device $B_{FR}$ are mounted on a left front wheel and a right front wheel as driving wheels of a vehicle, respectively. A left rear wheel brake device $B_{RL}$ and a right rear wheel brake device $B_{RR}$ are mounted on a left rear wheel and a right rear wheel as follower wheels, respectively. A brake pedal 1, as an operating member is connected to a control fluid pressure output unit 2. The output unit 2 controls an output fluid pressure from a fluid pressure supply source 3 in accordance with the amount of depression of the brake pedal 1, and outputs a fluid pressure corresponding to the amount of depression of the brake pedal 1 when the output pressure from the fluid pressure supply source 3 is abnormally reduced. During a normal braking when the output pressure from the fluid pressure supply source 3 is normal, an amplified fluid pressure delivered from the control fluid pressure output unit 2 is applied through fluid pressure transfer units $4_{FL}$ and $4_{FR}$ to the front wheel brake devices $B_{FL}$ and $B_{FR}$, and also, through a fluid pressure transfer unit $4_R$ and a proportional reducing valve 5 to the rear wheel brake devices $B_{RL}$ and $B_{RR}$. When the output pressure from the fluid pressure supply source 3 is abnormally reduced, a non-amplified fluid pressure delivered from the control fluid pressure output unit 2 in correspondence to the amount in which the brake pedal 1 is depressed is applied through the fluid pressure transfer units $4_{FL}$ and $4_{FR}$ to the front wheel brake devices $B_{FL}$ and $B_{FR}$, and also, through fluid pressure transfer unit $4_R$ and a proportional reducing valve 5 to the rear wheel brake devices $B_{RL}$ and $B_{RR}$. Further, hydraulic braking pressures of the brake devices $B_{FL}$, $B_{FR}$, $B_{RL}$ and $B_{RR}$ can be maintained or reduced by means of inlet valves $6_{FL}$ and $6_{FR}$ and outlet valves $7_{FL}$ and $7_{FR}$ independently corresponding to the front wheel brake devices $B_{FL}$ and $B_{FR}$; and by means of an inlet valve $6_R$ and an outlet valve $7_R$ which are common to the rear wheel brake devices $B_{RL}$ and $B_{RR}$; thereby, performing an antilock control. By controlling the opening and closing of a normally-opened solenoid valve 8 and a normally-closed solenoid valve 9 for a traction control, hydraulic braking pressures of the front wheel brake devices $B_{FL}$ and $B_{FR}$ can be increased in order to perform the traction control.

The fluid pressure supply source 3 comprises a hydraulic pump 10 for pumping a working oil from a reservoir R, an accumulator 11 connected to the hydraulic pump 10, and a pressure switch 12 for controlling the operation of the hydraulic pump 10.

The fluid pressure transfer units $4_{FL}$, $4_{FR}$ and $4_R$ basically have the same construction; and hence, the construction of only the fluid pressure transfer unit $4_{FL}$, as a representative, will be described below.

Figure 2:
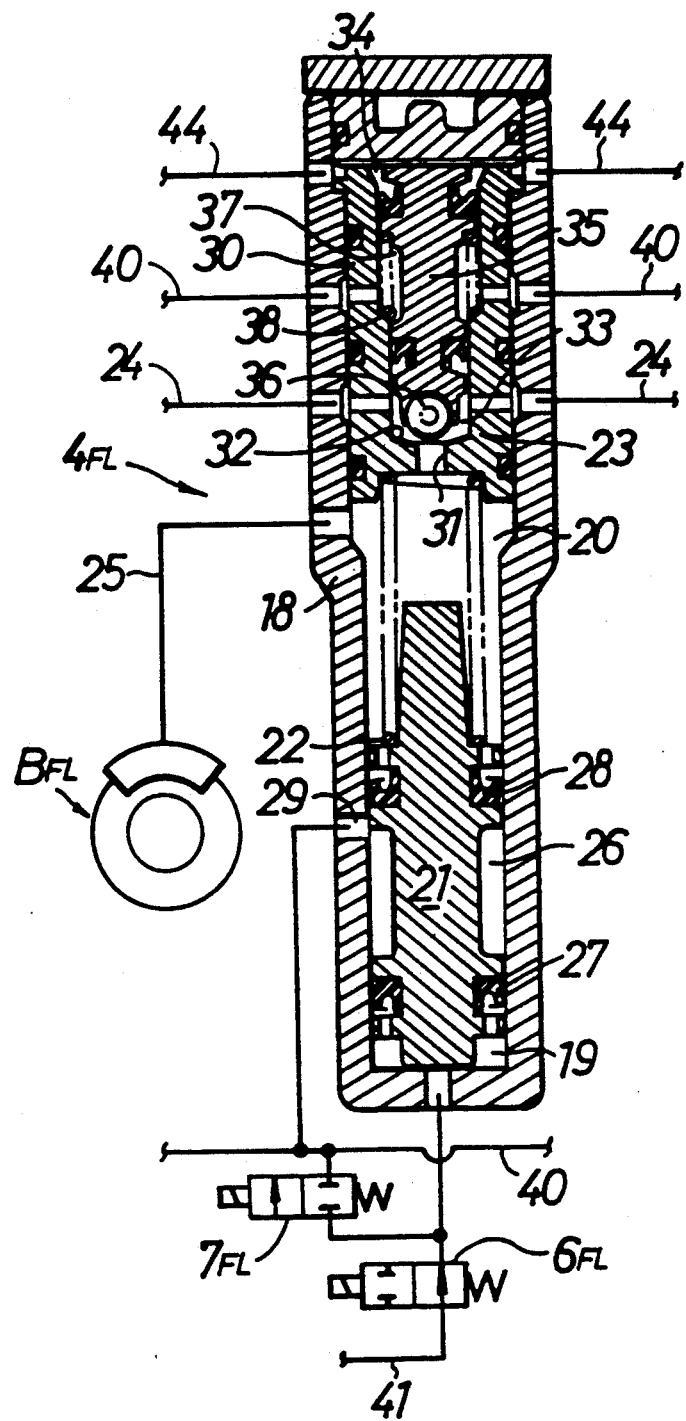

Referring to FIG. 2, the fluid pressure transfer unit $4_{FL}$ includes a housing 18 formed into a cylindrical shape with opposite ends closed. A free piston 21 is slidably received in the housing 18 such that opposite ends of the piston 21 face an input fluid pressure chamber 19 and an output fluid pressure chamber 20, respectively. A spring 22 is contained in the output fluid pressure chamber 20 in order to bias the free piston 21 toward the input fluid pressure chamber 19. A bypass valve 23 is mounted within the housing 18. The bypass valve 23 shuts off the communication between a passage 24 and the output fluid pressure chamber 20 when the output fluid pressure from the fluid pressure supply source 3 is normal, and permits the communication between the passage 24 and the output fluid pressure chamber 20 when the output fluid pressure from the fluid pressure supply source 3 is abnormally reduced.

The output fluid pressure chamber 20 communicates with the brake device $B_{FL}$ through a passage 25. The free piston 21 has an annular recess provided around its outer periphery in order to define an annular chamber 26 between the free piston 21 and an inner surface of the housing 18. A sealing member 27 is mounted on the outer periphery of the free piston 21 between the annular chamber 26 and the input fluid pressure chamber 19. A sealing member 28 is mounted on the outer periphery of the free piston 21 between the annular chamber 26 and the output fluid pressure chamber 20. At least the sealing member 28 adjacent the output fluid pressure chamber 20 is a cup seal which permits a flow of the working fluid from the annular chamber 26 to the output fluid pressure chamber 20. Moreover, the housing 18 is provided with a communication bore 29 leading to the annular chamber 26 regardless of the stroke of the free piston 21. The communication bore 29 is connected to the reservoir R via a release passage 40. The annular chamber 26 normally communicates with the reservoir R.

The bypass valve 23 includes a valve housing 30 which is formed into a cylindrical shape and fixedly received in the housing 18 in order to define the output fluid pressure chamber 20 between the valve housing 30 and the free piston 21. The valve housing 30 is provided, at a portion thereof closer to the output fluid pressure chamber 20, along with a valve seat 32 which has a valve bore 31 opened at a central portion thereof in order to communicate with the output fluid pressure chamber 20. A drive piston 35 is slidably received within the valve housing 30 in order to define a valve chest 33 leading to the passage 24 between the drive piston 35 and the valve seat 32. An end of the drive piston 35 opposite from the valve chest 33 faces a pilot chamber 34. A valve sphere 36 secured to a tip end of the drive piston 35 is contained in the valve chest 33 and is capable of being seated on the valve seat 32. A spring 38 is received in a spring chamber 37 defined between the drive piston 35 and the valve housing 30. The spring 38 applies a resilient force to the drive piston 35 in a direction so as to move the valve sphere 36 away from the valve seat 32. A passage 44 is communicated with the pilot chamber 34; and the spring chamber 37 is communicated with the reservoir R through a release passage 40.

In such a bypass valve 23, when the fluid pressure in the pilot chamber 34 is lower than a given value, the drive piston 35 is moved by a spring force of the spring 38 to a position in which the valve sphere 36 opens the valve bore 31; thereby, permitting the valve chest 33 to be in communication with the output fluid pressure chamber 20. When the fluid pressure in the pilot chamber 34 is equal to or more than the given value, the drive piston 35 is moved by the fluid pressure to a position in which the valve sphere 36 closes the valve bore 31; thereby, bringing the bypass valve 23 into its closed state.

With such a construction of the fluid pressure transfer unit $4_{FL}$, in a state where the bypass valve 23 is closed, a fluid pressure corresponding to a fluid pressure applied to the input fluid pressure chamber 19 can be delivered from the output fluid pressure chamber 20. In this case, the working fluid in the output fluid pressure chamber 20 cannot flow toward the input fluid pressure chamber 19. With the bypass valve 23 Opened, the fluid pressure from the passage 24 can be introduced into the output fluid pressure chamber 20 even in a condition whereby no fluid pressure is applied to the input fluid pressure chamber 19.

Further, the output fluid pressure chambers 20 in the fluid pressure transfer units $4_{FL}$ and $4_{FR}$ are independently connected to the brake devices $B_{FL}$ and $B_{FR}$, respectively. The output fluid pressure chamber 20 in the fluid pressure transfer unit $4_R$ is connected to the brake devices $B_{RL}$ and $B_{RR}$ through the common proportional reducing valve 5.

The inlet valves $6_{FL}$ and $6_{FR}$ and the outlet valves $7_{FL}$ and $6_{FR}$ are arranged in parallel, and connected to the input fluid pressure chambers 19 in the fluid pressure transfer units $4_{FL}$ and $4_{FR}$ corresponding to the front wheel brake devices $B_{FL}$ and $B_{FR}$, respectively. The inlet valve $6_R$ and the outlet valve $7_R$ are arranged in parallel, and connected to the input fluid pressure chamber 19 in the fluid pressure transfer unit $4_R$ corresponding to the rear wheel brake devices $B_{RL}$ and $B_{RR}$.

Each of the inlet valves $6_{FL}$, $6_{FR}$ and $6_R$ is a normally-opened solenoid valve which is closed upon energization, and each of the outlet valves $7_{FL}$, $7_{FR}$ and $7_R$ is a normally-closed solenoid valve which is opened upon energization. The outlet valves $7_{FL}$, $7_{FR}$ and $7_R$ are interposed between the input fluid pressure chambers 19 in the fluid pressure transfer units $4_{FL}$, $4_{FR}$ and $4_R$ and the release passage 40 leading to the reservoir R, respectively. The inlet valves $6_{FL}$ and $6_{FR}$ are interposed between a passage 41 and the input fluid pressure chambers 19 in the fluid pressure transfer units $4_{FL}$ and $4_{FR}$, respectively. The inlet valve $6_R$ is interposed between the input fluid pressure chamber 19 in the fluid pressure transfer unit $4_R$ and a passage 42, as shown in FIG. 1.

The proportional reducing valve 5 is one which is conventionally known, and serves to proportionally reduce the fluid pressure delivered from the output fluid pressure chamber 20 in the fluid pressure unit $4_R$ in order to apply the reduced fluid pressure to the brake devices $B_{RL}$ and $B_{RR}$.

The normally-opened solenoid valve 8 for the traction control is interposed between passages 43 and 44; and is capable of switching between a mode which communicates the passages 43 and 44 with each other upon deenergization and a mode which shuts off the communication therebetween upon energization. The normally-closed solenoid valve 9 for the traction control is interposed between the fluid pressure supply source 3 and the passage 44: and is capable of switching between a mode which shuts off the communication between the fluid pressure supply source 3 and the passage 44 upon deenergization and a mode which communicate therebetween upon energization. Both the solenoid valves 8 and 9 are energized when the traction control is conducted.

A one-way valve 45 is connected in parallel to the normally-opened solenoid valve 8 for permitting a flow of the working fluid only in a direction from the passage 43 to the passage 44. The one-way valve 45 functions to introduce, into the passage 44, the fluid pressure delivered from the control fluid pressure output unit 2 to the passage 43 when a braking operation has been conducted by means of the brake pedal 1 during execution of the traction control.

Further, a flow restraining unit 48 is interposed between the passages 44 and 41. The flow restraining unit 48 comprises a differential pressure regulating valve 46 which permits a flow of the working fluid from the passage 44 to the passage 41 in response to the fluid pressure in the passage 44 becoming higher than the fluid pressure in the passage 41 by a predetermined value or more, and a cup seal 47 functions as a one-way valve which permits a flow of the working fluid from the passage to the passage 44 in response to the fluid pressure in the passage 41 becoming slightly higher than the fluid pressure in the passage 44.

Figure 3:
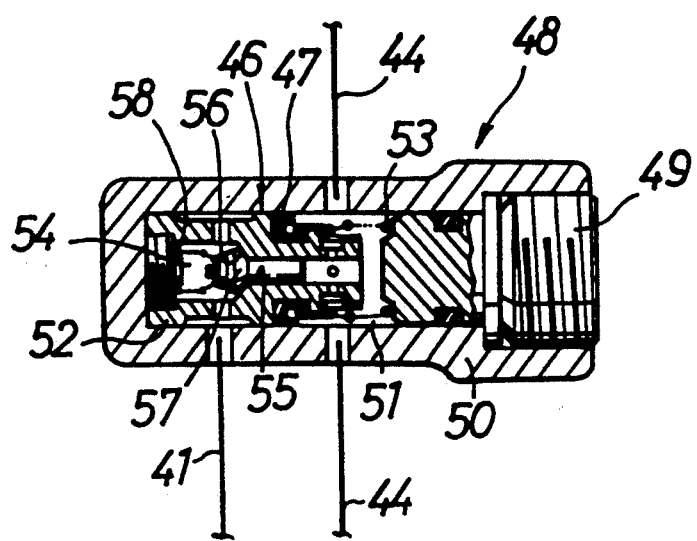

Referring to FIG. 3, the flow restraining unit 8 further includes a bottomed cylindrical housing 50 with one end thereof being closed by an occluding member 49. The differential pressure regulating valve 46 is mounted within the housing 50 and includes a value housing 52 received in the housing 50 in order to define a fluid chamber 51 leading to the passage 44 between the valve housing 52 and the occluding member 49. The cup seal 47 is mounted on an outer periphery of the valve housing 52 so as to come into sliding contact with an inner surface of the housing 50. A spring 52 is compressed between the valve housing 52 and the occluding member 49 for biasing the valve housing 52 toward the other end of the housing 50.

The differential pressure regulating valve 46 comprises a valve seat 56 provided on the valve housing 52 so as to have a valve bore 55 opened in a central portion thereof and leading to the fluid chamber 51; a valve member 57 which is contained within a valve chest 54 defined in the valve housing 52 so as to lead to the passage 41 such that the valve member 57 can be seated on the valve seat 56; and a spring 58 contained within the valve chest 54 so as to exhibit a resilient force in a direction in order to permit the valve member 57 to be seated on the valve seat 56. The differential pressure regulating valve 46 is opened in response to the fluid pressure in the fluid chamber 51 leading to the passage 44 becoming higher than the fluid pressure in the valve chest 54 leading to the passage 41 by a predetermined value or more.

The cup seal 47 is mounted on the outer periphery of the valve housing 52 in such a manner as to inhibit a flow of the working fluid from the fluid chamber 51 to the passage 41, but to permit a flow of the working fluid from the passage 41 to the fluid chamber 51.

The differential pressure regulating valve 46 inhibits a flow of the working fluid, at an initial stage of the braking operation, from the passage 44 to the passage 41 leading to the input fluid pressure chambers 19 in the fluid pressure transfer units $4_{FL}$ and $4_{FR}$, until such time as the bypass valve 23 in each of the fluid pressure transfer units $4_{FL}$, $4_{FR}$ and $4_R$ is closed in response to an increase in fluid pressure in the pilot chamber 34. Thus, at the initial stage of the braking operation, the braking pressure is applied to the input fluid pressure chamber 19 in each of the fluid pressure transfer units $4_{FL}$ and $4_{FR}$ after closing of each bypass valve 23. When the braking operating force has been released, the working fluid in the passage 41 is escaped into the reservoir R by means of the cup seal 47.

Figure 4:
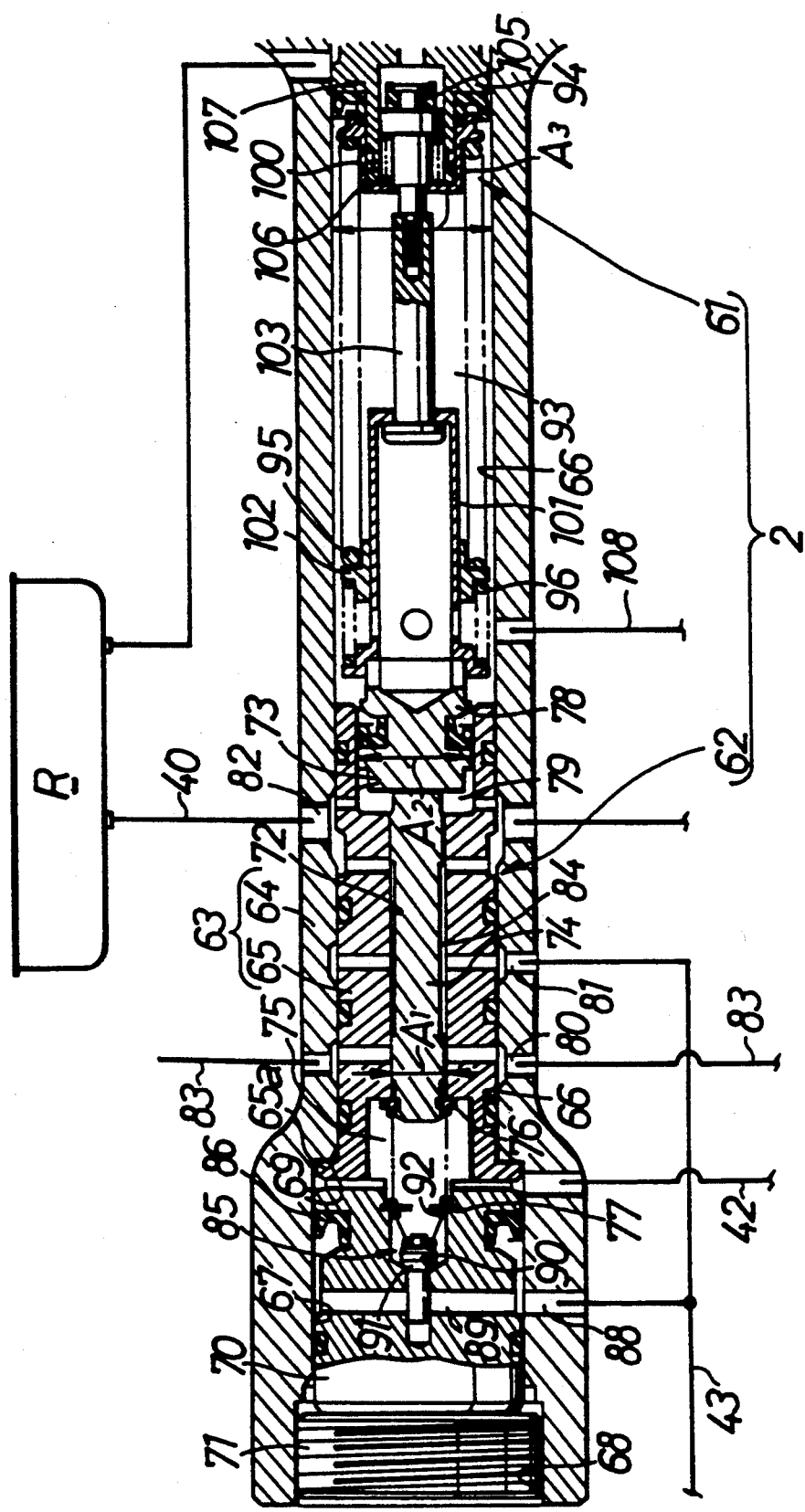
Figure 5:
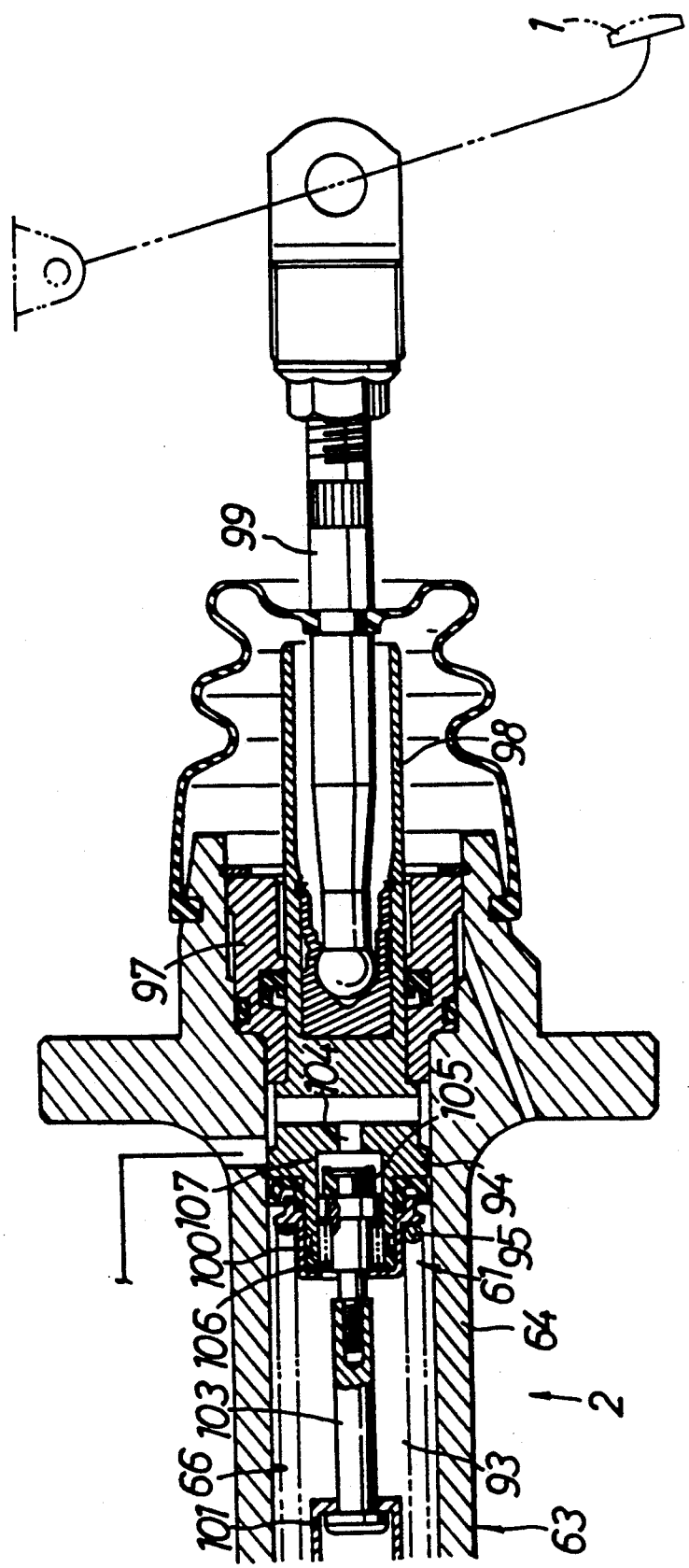

FIGS. 4 and 5 illustrate details of the control fluid pressure output unit 2 shown in FIG. 1. The control fluid pressure output unit 2 comprises an auxiliary fluid pressure generating means 61 capable of generating a non-amplified fluid pressure corresponding to the braking operation force provided by the brake pedal 1; and a fluid pressure control valve 62 capable of controlling the output pressure from the fluid pressure supply source 3 in accordance with the operation amount of brake pedal 1 so as to output an amplified fluid pressure.

The control fluid pressure output unit 2 has a housing 63 which is comprised of a large cylinder body 64 and a small cylinder body 65 fixedly received in a front end of the large cylinder body 64. Provided in the large cylinder body 64 are a cylinder bore 66, a fitting bore 67 having a larger diameter than the diameter of the cylinder bore 66 and coaxially connected to a front end of the cylinder bore 66, and a threaded bore 68 having a larger diameter than that of the fitting bore 67 and coaxially connected to a front end of the fitting bore 67. The small cylinder body 65 is formed into a cylindrical shape having, at a front end thereof, an engage collar 65a engaging a step 69 between the cylinder bore 66 and the fitting bore 67, and is received in the cylinder bore 66. Moreover, a plug member 70 is fitted in the fitting bore 67; and a threaded member 71 is threadedly engaged in the threaded bore 68 and tightened so that the engage collar 65a is clamped by the plug member 70 and the step 69. Consequently, the small cylinder body 65 is fixed within the large cylinder body 64. The small cylinder body 65 is provided with a small slide bore 72 and a large slide bore 73 coaxially connected to a rear end of the small slide bore 72.

The fluid pressure control valve 62 comprises a spool 74 as a sliding member slidably received in the small slide bore 72 in the small cylinder body 65. A reaction chamber 75 is defined between the small cylinder body 65 and the plug member 70, and connected to the passage 42. A front surface of the spool 74 faces the reaction chamber 75. A retaining ring 76 is fitted over a front end of the spool 74 to abut against the small cylinder body 65 so as to define a retreat limit for the spool 74. A spring 77 is compressed within the reaction chamber 75 between the plug member 70 and the retaining ring 76 for biasing the spool 74 rearwardly.

An urging piston 78, as a component for the auxiliary fluid pressure generating means 61, is slidably received in the large slide bore 73 in the small cylinder body 65. The urging piston 78 abuts against a rear end of the spool 74. A release chamber 79 is defined between the urging piston 78 and the small cylinder body 65 so as to communicate with the reservoir R. Thus, a rearward force is applied to the spool 74 by the fluid pressure in the reaction chamber 75 and by the spring 77, and a forward force is applied to the spool 74 by the urging piston 78. Therefore, the position of the spool 74 in the small cylinder body 65 is determined by a balance of these forces.

The large and small cylinder bodies 64 and 65 cooperate to form the housing 63, and are provided with an input port 80, an output port 81 and a release port 82, at distances in sequence from an axially front side to an axially rear side of the cylinder bodies 64 and 65. These ports 80, 81 and 82 are opened in an inner surface of the small slide bore 72. The input port 80 communicates with a passage 83 leading to the fluid pressure supply source 3. The output port 81 communicates with the passage 43. The release port 82 communicates with the reservoir R through the release passage 40. Moreover, an annular recess 84 is provided around an outer periphery of the spool 74. The length of the annular recess 84 along an axis of the spool 74 is set such that when the spool 74 is in an advanced position, the output port 81 is in communication with the input port 80 through the annular recess 84 and out of communication with the release port 82. Also, when the spool 74 is at a retreated position, the output port 81 is in communication with the release port 82 through the annular recess 84 and out of communication with the input port 80.

Provided between the passage 43 leading to the output port 81 and the reaction chamber 75 are a differential pressure regulating valve 85 which permits a flow of the working fluid from the passage 43 to the reaction chamber 75 in response to the fluid pressure in the passage 43 (i.e., in the output port 81) becoming higher than the fluid pressure in the reaction chamber 75 by a predetermined value or more, and a cup seal 86 which functions as a one-way valve for permitting a flow of the working fluid from the reaction chamber 75 to the passage 43 in response to the fluid pressure in the reaction chamber 75 becoming slightly higher than the fluid pressure in the passage 43.

An introducing port 88 is provided in the large cylinder body 64 in the housing 63 so as to lead to the passage 43. The differential pressure regulating valve 85 is provided so as to open and close a passage 89 which is provided in the plug member 70 in order to connect the introducing port 88 and the reaction chamber 75. The differential pressure regulating valve 85 comprises a valve seat 90 leading to the passage 89 and opened to the reaction chamber 75, a valve member 91 contained within the reaction chamber 75, such that it can be seated on the valve seat 90, and a spring 92 for biasing the valve member 91 in a direction to seat it on the valve seat 90. The cup seal 86 is mounted around the outer periphery of the plug member 70 so as to permit a flow of the working fluid from the reaction chamber to the introducing port 88.

The differential pressure regulating valve 85 functions in such a manner as to increase the fluid pressure delivered to the passage 43 to the certain value before an operational reaction is produced at the initial stage of the braking operation by preventing the fluid pressure from being produced in the reaction chamber 75 until a fluid pressure outputted from the output port 81 of the output unit 2 to the passage 43 is increased to a certain value at the initial stage of the braking operation. Also, the differential pressure regulating valve 85 functions in such a way as to inhibit the delivery of the fluid pressure to the passage 42 leading to the input fluid pressure chamber 19 in the fluid pressure transfer unit 4R until the bypass valve 23 of the fluid pressure transfer unit 4R is closed. Thus, at the initial stage of the braking operation, the fluid pressure in the passage 42 is applied to the input fluid pressure chamber 19 in the fluid pressure transfer unit 4R after the bypass valve 23 of the fluid pressure transfer unit 4R is closed. The cup seal 86 functions in such a manner as to escape the working fluid in the passage 42 through the passage 43 via the output port 81, the annular recess 84 and the release port 82 and to the reservoir R when the braking operation force has been released.

The auxiliary fluid pressure generating means 61 comprises the urging piston 78 slidably received in the large slide bore 73 and operatively connected to the rear end of the spool 74 in the fluid pressure control valve 62. The auxiliary hydralic pressure generating means 61 further includes an input piston 94 operatively connected to the brake pedal 1 and slidably received in the cylinder bore 66 such that a front surface of the input piston 94 faces a pressure chamber 93 which is defined between the input piston 94 and a back surface of the urging piston 78. The auxiliary fluid pressure generating means 61 further has a pair of springs 95 and 96 interposed in series between both the pistons 78 and 94.

A restraining member 97 is fixed to an opening at the rear end of the large cylinder body 64 in the housing 63 for defining a retreat limit for the input piston 94. A piston rod 98 is movably and fluid tightly mounted to extend through the restraining member 97 and coaxially connected to the input piston 94. A push rod 99 is connected to the brake pedal 1 and swingably connected at a front end thereof to the piston rod 98. Consequently, the input piston 94 is advanced in a direction so as to reduce the volume of the pressure chamber 93 in response to the depression of the brake pedal 1.

A cup-like retainer 100 is fitted over a front end of the input piston 94, and a bottomed cylindrical retainer 101 is mounted so as to abut against the back of the urging piston 78. The springs 95 and 96 are compressed between both the retainers 100 and 101, and a guide member 102 is slidably fitted over the retainer 101 and interposed between the springs 95 and 96. Moreover, a rod 103 is movably mounted to extend through the retainer 101 with its rear end engaged with the retainer 100 in such a manner that a retreat limit position relative to the urging piston 78 is defined by the retainer 101. This consequently determines the maximum spacing between the urging piston 78 and the input piston 94. The spring 95 has a spring constant set at a relatively large value, and the spring 96 has a spring constant set at a relatively small value.

A shut-off valve 107 is capable of being shifted to switchover the connection and disconnection between the pressure chamber 93 and the reservoir R; and is comprised of a value bore 104 provided in the input piston 94 so as to lead to the reservoir R, a valve member 105 mounted at a rear end of the rod 103, and a spring 106 mounted between the rod 103 and the retainer 100 so as to bias the rod 103 in a direction to close the valve bore 104 by the valve member 105. The shut-off valve 107 is opened in order to have the pressure chamber 93 in communication with the reservoir R in a condition of the maximum spacing between the urging piston 78 and the input piston 94. The shut-off valve 107 is closed in order to shut off the communication between the pressure chamber 93 and the reservoir R when the input piston 94 is advanced relative to the rod 103 from such condition.

In the control fluid pressure output unit 2 of this invention, a pressure receiving area $A_1$ of the spool 74 facing the reaction chamber 75 is smaller than a pressure receiving area $A_2$ of the urging piston 78 facing the pressure chamber 93. A pressure receiving area A, of the input piston 94 facing the pressure chamber 93 is larger than the pressure receiving area $A_2$ of the urging piston 78 (i.e., $A_1 < A_2 < A_3$).

A passage 108 is connected to the pressure chamber 93 in the auxiliary fluid pressure generating means 61, and is also connected to a stroke accumulator 13, as shown in FIG. 1.

Figure 6:
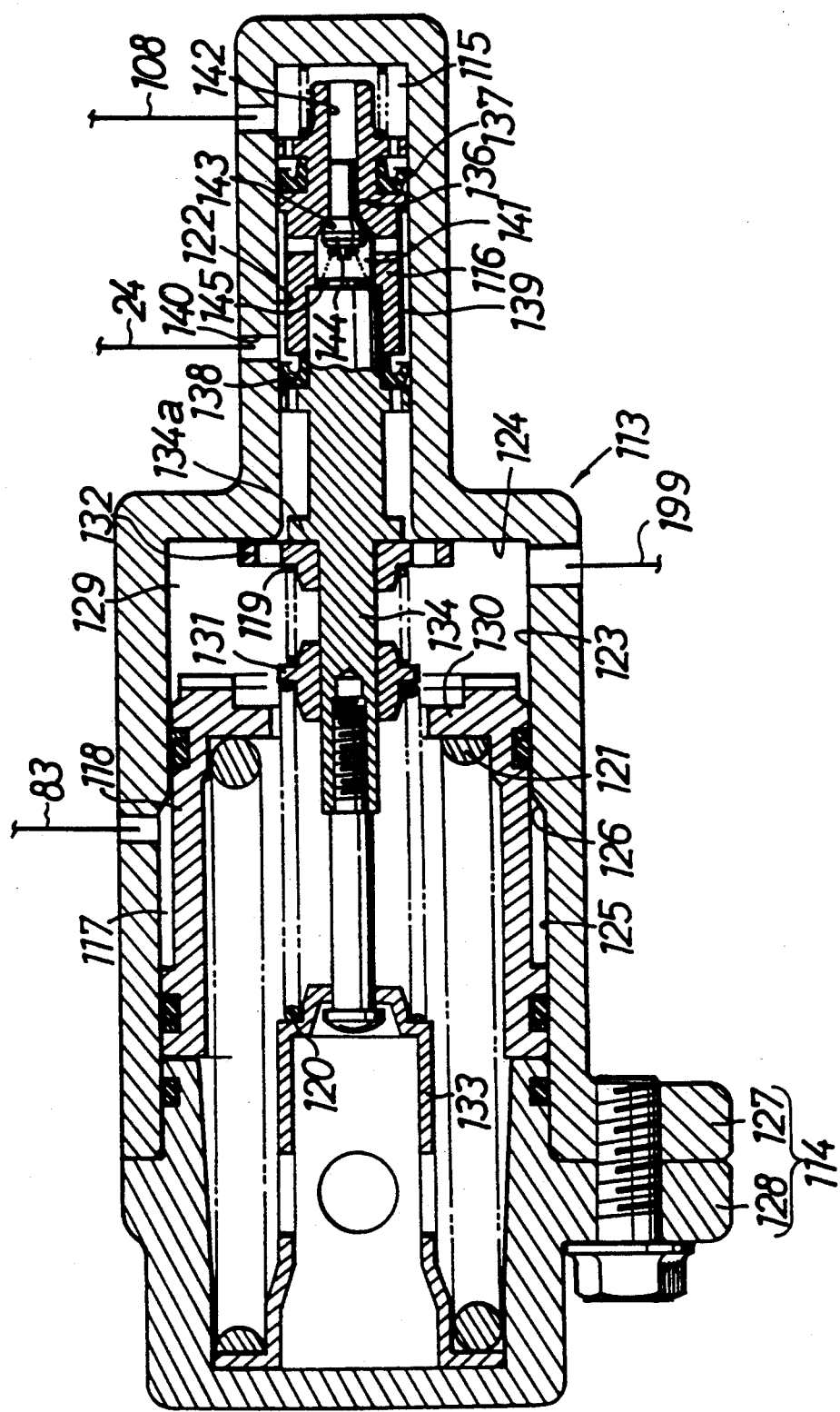

Referring to FIG. 6, an accumulator piston 116 is slidably received in a casing 114 of the stroke accumulator 113 so as to define an accumulating chamber 115 leading to the passage 108 between the accumulator piston 116 and the casing 114. A back-up piston 118 is also slidably received in the casing 114 so as to define a pilot chamber 117 between the back-up piston 118 and the casing 114, wherein the pilot chamber 117 leads to the passage 83 leading to the fluid pressure supply source 3. The stroke accumulator 113 comprises first and second accumulator springs 119 and 120 as first biasing means for resiliently biasing the accumulator piston 116 in a direction so as to reduce the volume of the accumulating chamber 115, and a back-up spring 121 as second biasing means for exhibiting a spring load larger than a spring load provided by the accumulator springs 119 and 120 so as to resiliently bias the back-up piston 118 in a direction in order to reduce the volume of the pilot chamber 117.

The casing 114 comprises a stepped and bottomed cylinder 127 having an opened end occluded by an occluding member 128. The stepped and bottomed cylinder 127 comprises a first cylinder bore 122 with one end closed, a second cylinder bore 123 having a diameter larger than a diameter of the first cylinder bore 122 and coaxially connected at one end to the other end of the first cylinder bore 122 through a step 124; and a third cylinder bore 125 having a diameter larger than a diameter of the second cylinder bore 123 and coaxially connected at one end to the other end of the second cylinder bore 23 through a tapered step 126.

The accumulator piston 116 is slidably received in the first cylinder bore 122 so as to define the accumulating chamber 115 between the accumulator piston 116 and one end wall of the casing 114. The back-up piston 118 is slidably received in the second and third cylinder bores 123 and 125 so as to define a release chamber 129 between the back-up piston 118 and the accumulator piston 116, wherein the release chamber 129 leads to the reservoir R through a passage 199. The pilot chamber 117 leading to the fluid pressure supply source 3 is defined between the step 126 as well as an inner surface of the third cylinder bore 125 and an outer surface of the back-up piston 118.

The back-up piston 118 is formed into a cylindrical shape and has a radially inwardly projecting receiving collar 130 provided at a front end thereof of the piston 118 (i.e., at a portion thereof closer to the accumulator piston 116).

The first and second accumulator springs 119 and 120 are interposed in series between retainers 132 and 133 with a guide member 131 interposed between both the springs. The piston rod 134 coaxially connected to the accumulator piston 116 has a radially outwardly projecting collar 134a provided at an intermediate portion of the piston rod 134. The retainer 132 is formed into a disk shape surrounding the piston rod 134 in such a manner that it is brought into engagement with the collar 134a. The retainer 133 is formed into a bottomed cylindrical shape with its opened end abutting against the occluding member 128. The guide member 131 is slidably fitted over the piston rod 134. The first accumulator spring 119 is disposed between the retainer 132 engaged with the collar 134a of the piston rod 134 and the guide member 131. Also, the second accumulator spring 120 is disposed between the guide member 131 and the retainer 133 supported by the occluding member 128. The load characteristics of the accumulator springs 119 and 120 are different from each other, such that the spring load characteristic for biasing the accumulator piston 116 toward the accumulating chamber 115 is varied in the course Of movement of the accumulator piston 116 in a direction so as to increase the volume of the accumulating chamber 115.

The back-up spring 121 is compressed within the release chamber 129 between the receiving collar 130 of the back-up piston 118 and the retainer 133.

In the stroke accumulator 113 of this invention, in a condition whereby the fluid pressure supply source 3 is in normal operation and whereby a normal fluid pressure from the fluid pressure supply source 3 is applied to the pilot chamber 117, the back-up piston 118 is moved against the biasing force of the back-up spring 121 in the direction so as to increase the volume of the pilot chamber 117 (i.e., away from the accumulator piston 116). However, if the operation of the fluid pressure supply source 3 is out of order which causes the fluid pressure in the pilot chamber 117 to be abnormally reduced, the back-up piston 118 is moved in a direction so as to reduce the volume of the pilot chamber 117 (i.e., toward the accumulator piston 116) by the spring force of the back-up spring 121 so that the receiving collar 130 of the back-up piston 118 abuts against the retainer 132. Thus, in place of the first and second accumulator springs 119 and 120, the larger spring load of the back-up piston 121 is applied to the accumulator piston 116.

In the stroke accumulator 113, the maximum spacing between the accumulator 116 and the retainer 133 is restrained by an engagement of the retainer 133 with the piston rod 134 connected to the accumulator piston 116; and the maximum spacing between the retainer 133 and the back-up piston 118 is restrained by engagement of the back-up piston 118 with the accumulator piston 116. In other words, the maximum spacing between the retainer 133 and the back-up piston 118 is restrained by an engagement of the back-up piston 118 with the retainer 132 engaging the collar 134a of the piston rod 134. Thus, the accumulator piston 116, the retainer 132, both that accumulator springs 119 and 120, the retainer 133, the back-up piston 118 and the back-up spring 121 can be eparately assembled as an interior assembly separately from the casing 114. The assembling of the stroke accumulator 113 is completed only by inserting the interior assembly into the bottomed cylinder 127 Of the casing 114 and assembling the occluding member 128 to the bottomed cylinder 127; thereby, leading to an improved assemblage of the stroke accumulator 113.

The stroke accumulator 113 includes a differential pressure regulating valve 136 which permits a flow of the working fluid from the accumulating chamber 115 to the passage 24 when the fluid pressure in the accumulating chamber 115 becomes higher than the fluid pressure in the passage 24 by a predetermined value. The stroke accumulator 113 further include s a cup seal 137 Which functions as a one-way valve for permitting a flow of the working fluid from the passage 24 to the accumulating chamber 115 in response to the fluid pressure in the passage 24 becoming higher than the fluid pressure in the accumulating chamber 115. The stroke accumulator 113 also has a cup seal 138 which funtions as a one-way valve for permitting a flow of the working fluid from the release chamber 129 leading to the reservoir R to the passage 24 when the passage 24 is depressurized.

An annular recess is provided around the outer periphery of the accumulator piston 116 so as to define an annular chamber 139 between the annular recess and the inner surface of the first cylinder bore 122. The bottomed cylinder 127 of the casing 114 is provided with a connecting bore 140 leading to the annular chamber 139; and the passage 24 is connected to the connecting bore 140. Thus, the annular chamber 139 communicates with the passage 24.

The differential pressure regulating valve 136 includes a valve member 144 which is contained in a valve chest 141 provided in the accumulator piston 116 in communication with the annular chamber 139. The valve member 144 is seatable on a valve seat 143 which has a valve bore opened in a central portion thereof and leading to the accumulating chamber 115, and is further provided on the accumulator piston 116 so as to face to the valve chest 141. Further, a spring 145 is contained in the valve chest 141 for exhibiting a resilient force in a direction so as to seat the valve member 144 On the valve seat 143. The differential pressure regulating valve 136 is opened; thereby, permitting the fluid pressure in the accumulating chamber 115 to be applied to the valve chest 33 in each of the fluid pressure transfer units $4_{FL}$, $4_{FR}$ and $4_R$ when the fluid pressure in the valve chest 141 leading to the valve chest 33 in the bypass valve 23 in each of the fluid pressure transfer units $4_{FL}$, $4_{FR}$ and $4_R$ through the passage 24 and the annular chamber 139 is lower than the fluid pressure in the accumulating chamber 115 by a predetermined value or more.

The cup seal 137 is mounted around the outer periphery of the accumulator piston 116 between the annular chamber 139 and the accumulator chamber 115; and the cup seal 138 is mounted around the outer periphery of the accumulator piston 116 between the annular chamber 139 and the release chamber 129.

With the differential pressure regulating valve 136, the output pressure from the auxiliary fluid pressure generating means 61 is prevented from being applied to the valve chest 33 in the bypass valve 23 in each of the fluid pressure transfer units $4_{FL}$, $4_{FR}$ and $4_R$ until such time as the fluid pressure generated in the pressure chamber 93 in the auxiliary fluid pressure generating means 61 in the control fluid pressure output unit 2 becomes higher than a certain value as a result of the braking operation of the brake pedal 1. The differential pressure regulating valve 136 can be opened after the closing of the bypass valve 23 in response to an increase in pilot input pressure in the pilot chamber 34. In addition, because of the breathing of the passage 24 by the advancement of the braking piston due to the wearing of a brake pad of each of the brake devices $B_{FL}$, $B_{FR}$, $B_{RL}$ and $B_{RR}$, a variation in temperature or the like is possible through the cup seal 137 during the increase in the pressure, and through the cup seal 138 during the reduction of the pressure.

The operation of the above-described embodiment of this envention will now will be described below. First, suppose that a normal braking operation is conducted in a condition whereby the fluid pressure supply source 3 is in a normal operation. In this case, the inlet valves $6_{FL}$, $6_{FR}$ and $6_R$ and the outlet valves $7_{FL}$, $7_{FR}$ and $F_R$ are in their deenergized states (states as shown in FIG. 1), and the normally-opened and normally-closed solenoids 8 and 9 for traction control are also in their deenergized states (states as shown in FIG. 1). Therefore, the passage 43 for guiding an amplified fluid pressure from the output port 81 in the control fluid pressure output unit 2 is in communication with the pilot chambers 34 in the bypass valves 23 of the fluid pressure transfer units $4_{FL}$, $4_{FR}$ and $4_R$ through the passage 44, and is in a connected relation to the input fluid pressure chambers 19 in the fluid pressure transfer units $4_{FL}$ and $4_{FR}$ through the differential pressure regulating valve 46 and the passage 41, and also, to the input fluid pressure chamber 19 in the fluid pressure transfer unit $4_R$ through the differential pressure regulating valve 85, the reaction chamber 75 and the passage 42.

When the brake pedal 1 is depressed in this condition, the input piston 94 in the control fluid pressure output unit 2 is advanced so as to apply an advancing force to the urging piston 78 through the springs 95 and 96; thereby, advancing the spool 74 of the fluid pressure control valve 62 while compressing the spring 77.

A fluid pressure in the reaction chamber 75 (i.e., a fluid pressure for biasing the spool 74 in a retreating direction) is not generated by the action of the differential pressure regulating valve 85 until the spool 74 is advanced to a position for placing the input port 80 in communication with the output port 81 and out of communication with the release port 82 so that the output pressure in the passage 43 reaches a certain value. Therefore, a rapidly increased fluid pressure is delivered to the passage 43 at the initial stage of the braking operation. Consequently the bypass valves 23 in the fluid pressure transfer units $4_{FL}$, $4_{FR}$ and $4_R$ are closed, and then, the fluid pressure is applied through the passage 41 to the input fluid pressure chambers 19 in the fluid pressure transfer units $4_{FL}$ and $4_{FR}$ by opening of the differential pressure regulating valve 46, while the fluid pressure is applied through the passage 42 to the input fluid pressure chambers 19 in the fluid pressure transfer unit $4_R$ by the opening of the differential pressure regulating valve 85.

When a force in the retreating direction which is a sum of the spring force of the spring 77 and a force resulting from multiplication of the sectional area of the spool 74 by the fluid pressure in the reaction chamber 75 in the fluid pressure control valve 62 becomes larger than the spring load of the springs 95 and 96, the input piston 94 is advanced relative to the urging piston 78, while compressing the springs 95 and 96 so that the shut-off valve 107 is closed to put the pressure chamber 93 out of communication with the reservoir R; thereby, reducing the volume Of the pressure chamber 93 so as to generate a fluid pressure in the reaction chamber 93.

Therefore, notwithstanding that the accumulating chamber 115 in the stroke accumulator 113 for insuring that an operating stroke is in communication with the pressure chamber 93, the initial operating stroke cannot be absorbed by the stroke accumulator 113; thereby, resulting in a unavailable stroke.

Thereafter, the fluid pressure in the pressure chamber 93 is accumulated in the accumulating chamber 115 in the stroke accumulator 113, and the input piston 94 is further advanced by an Operating force opposing to the biasing force of the accumulator springs 119 and 120 on the accumulator piston 116 so that an operating stroke can be insured by the stroke accumulator 113.

After a generation of the fluid pressure in the pressure chamber 93, the spool 74 in the fluid pressure control valve 62 is moved longitudinally so that the force in the retreating direction from the reaction chamber 75 is balanced with the force in the advancing direction from the reaction chamber 93. This, accordingly, controls the output pressure from the fluid pressure supply source 3 so that an amplified fluid pressure corresponding to the amount in which the brake pedal 1 is operated is delivered from the control fluid pressure output unit 2 to the passage 43. Thus, a braking force is provided in each of the brake devices $B_{FL}$, $B_{FR}$, $B_{RL}$ and $B_{RR}$ by the amplified fluid pressure. A hydraulic circuit in the fluid pressure supply source 3 is isolated from the brake devices $B_{FL}$, $B_{FR}$, $B_{RL}$ and $B_{RR}$ by the free pistons 21 in the fluid pressure transfer units $4_{FL}$, $4_{FR}$ and $4_R$ and therefore, a gas having the possibility of being incorporated into the working fluid in the fluid pressure supply source 3 is prevented from exerting an adverse effect on each of the brake devices $B_{FL}$, $B_{FR}$, $B_{RL}$ and $B_{RR}$.

When the input piston 94 is to be further advanced by the additional operation of the brake pedal 1 in a condition in which the spool 74 has shut off the communication between the output port 81 and the input port 80 as a result of generation of the fluid pressure in the reaction chamber 75, a relatively small operating force is only required to advance the spool 74 until the input and output ports 80 and 81 are put into communication with each other. This, accordingly, is due to the amount of advancement of the urging piston; and thus, the spool 74 is larger compared to the amount of advancement of the input piston due to the fact that the pressure receiving area $A_2$ of the urging piston 78 facing the pressure chamber 93 is smaller than the pressure receiving area $A_3$ of the input piston 94 facing the pressure chamber 93 (i.e., $A_2 < A_3$).

When the depression force on the brake Pedal 1 is too large so that the wheel is about to become locked during such a braking, the inlet valve $6_{FL}$, $6_{FR}$ or $6_R$ (corresponding to the wheel about to become locked) is energized to shut off the communication between the passage 41 and the fluid pressure transfer unit $4_{FL}$ or $4_{FR}$ or between the passage 42 and the fluid pressure transfer unit $4_R$. This, accordingly, suppresses an increase in braking force so as to avoid the entering of the wheel into its locked state. If the wheel is still likely to enter its locked state, then the locking tendency of the wheel can be overcome by energizing the corresponding outlet valve $7_{FL}$, $7_{FR}$ or $7_R$ so as to place the input fluid pressure chamber 19 in the corresponding fluid pressure transfer unit $4_{FL}$, $4_{FR}$ or $4_R$ into communication with the reservoir R; thereby, reducing the braking pressure.

When such an antilock control is carried out, the spool 74 is slid longitudinally as the fluid pressure in the reaction 75 is varied. However, the volume of the pressure chamber 93 as the spool 74 is slid longitudinally varies because the relationship among the pressure receiving area $A_1$ of the spool 74 facing the reaction chamber 75, the pressure receiving area $A_2$ of the urging piston 78 facing the pressure chamber 93, and the pressure receiving area $A_3$ of the input piston 94 facing the pressure chamber 93 is $A_1 < A_2 < A_3$. Therefore, it is possible to suppress, to a relatively small extent, the kick-back acting on the brake pedal 1 with of the variation in fluid pressure in the reaction chamber 75.

In the event that the output pressure from the fluid pressure supply source 3 has been abnormally reduced due to trouble of the hydraulic pump 10 or the like during the above-described braking, the bypass valve 23 in each of the fluid pressure transfer units $4_{FL}$, $4_{FR}$ and $4_R$ is opened in response to a reduction in fluid pressure delivered from the control fluid pressure output unit 2 to the passage 43. Thus, the fluid pressure produced in the pressure chamber 93 in response to the advancement of the input piston 94 by the depression of the brake pedal 1 is supplied through the passage 108, the differential pressure regulating valve 136, the annular chamber 139 and the passage 24 and via the bypass valves 23 of the fluid pressure transfer units $4_{FL}$ and $4_{FR}$ to both the front wheel brake devices $B_{FL}$ and $B_{FR}$, and also, via the bypass valve 23 of the fluid pressure transfer unit $4_R$ and the proportional reducing valve 5 to the rear wheel brake devices $B_{RL}$ and $B_{RR}$. Therefore, even in a condition whereby the output pressure from the fluid pressure supply source 3 has been abnormally reduced, the fluid pressure generated in the pressure chamber 93 of the auxiliary fluid pressure generating means 61 can be applied to each of the brake devices $B_{FL}$, $B_{FR}$, $B_{RL}$ and $B_{RR}$. Moreover, the amount of variation in volume of the pressure chamber 93 with the advancement of the urging piston 78 can be diminished to a relatively small value; thereby, reducing the unavailable stroke of the brake pedal 1 because the pressure receiving area $A_2$ of the urging piston 78 facing the pressure chamber 93 is smaller than the pressure receiving area $A_3$ of the input piston 94 facing the pressure chamber 93.

In this case, in the stroke accumulator 113, the fluid pressure in the pilot chamber 117 is abnormally reduced with a reduction in output fluid pressure from the fluid pressure supply source 3; thereby, causing the back-up piston 118 to be advanced to abut against the retainer 132 and further causing the retainer 132 to abut against the collar 134a of the piston rod 134 so that the back-up spring 121 having the larger spring load acts on the accumulator piston 116. Therefore, when the output fluid pressure from the fluid pressure supply source 3 has been abnormally reduced, the fluid pressure produced in the pressure chamber 93 cannot be excessively consumed, and the depression stroke of the brake pedal 1 cannot be increased more than necessary.

Figure 7:
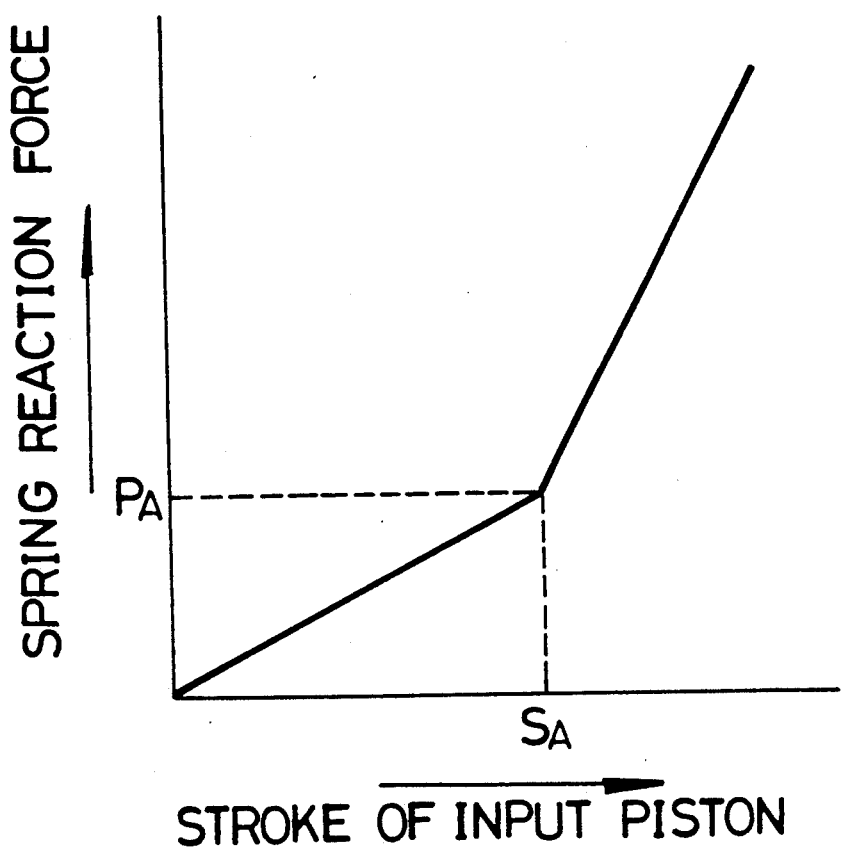

In the auxiliary fluid pressure generating means 61 of the control fluid pressure output unit 2, the spring 95 having the larger spring load and the spring 96 having the smaller spring load are interposed in series between the input piston 94 and the urging piston 78. For this reason, the spring reaction with respect to the stroke of the input piston 94 is as shown in FIG. 7. More specifically, until the stroke of the input piston 94 reaches a stroke amount $S_A$ after the start of advancement of the input piston 94, the spring reaction slowly increases until it reaches a predetermined value $P_A$; and if the stroke of the input piston 94 exceeds the stroke amount $S_A$, the spring reaction increases rapidly. With such a relationship between the spring reaction and the stroke of the input piston, when there is a defect produced in the fluid pressure system leading to the pressure chamber 93 in a condition in which the output pressure from the fluid pressure supply source 3 is normal, the increase in stroke of the brake pedal 1 is suppressed to a level slightly larger than the stroke amount $S_A$. In addition, when the fluid pressure system leading to the pressure chamber 93 is normal and the output pressure from the fluid pressure supply source 3 has been abnormally reduced, the increase in spring reaction acting on the brake pedal 1 from the input piston 94 is suppressed to a level slightly larger than the predetermined value $P_A$.

Further, when the driving force from the engine is too large during non-braking so that the driving wheels are about to slip excessively, the normally-opened and normally-closed solenoid valves 8 and 9 for traction control are energized. This, accordingly, causes the output fluid pressure from the fluid pressure supply source 3 to be applied to the input fluid pressure chambers 19 in the fluid pressure transfer units $4_{FL}$ and $4_{FR}$ so that a braking force is generated in the left and right front wheel brake devices $B_{FL}$ and $B_{FR}$ which are the driving wheels; thereby, avoiding the generation of excessive slipping. Thereafter, the braking force can be controlled by controlling the energization and deenergization of the inlet valves $6_{FL}$ and $6_{FR}$ and the outlet valves $7_{FL}$ and $7_{FR}$ in the same manner as in the above-described antilock control.

In such a braking pressure control system, the differential pressure regulating valve 85 for preventing the fluid pressure 72 from being applied to the reaction chamber 75 (i.e., preventing the operational reaction from acting on the brake pedal 1 at the initial stage of the braking operation until the fluid pressure delivered from the output port 81 of the control fluid pressure output unit 2 reaches a certain value) is mounted in the plug member 70 which is one component for the control fluid pressure output unit 2, and therefore, the braking pressure control system can be formed in a compact construction.

The breathing of the output fluid pressure chamber 20 in each of the fluid pressure transfer units $4_{FL}$, $4_{FR}$ and $4_R$ is made possible by the sealing member 28 mounted around the outer periphery of the free piston 21, and the breathing of the passage 24 leading to the valve chest 33 in each of the bypass valves 23 is made possible by the cup seals 137 and 138 mounted around the outer peripheries of the stroke accumulator 113 and the accumulator piston 116. Therefore, the one-way valves for producing the breathing are organically integrated with the free piston 21 and the accumulator piston 116, respectively; thereby, providing a compact construction. Further, since the differential pressure regulating valve 136 for preventing the fluid pressure in the pressure chamber 93 from being applied to the bypass valve 23, until the pressure in the pressure chamber 93, becomes higher than the predetermined value is provided in the accumulator piston 116, it is possible to further provide a compact construction.

Figure 8:
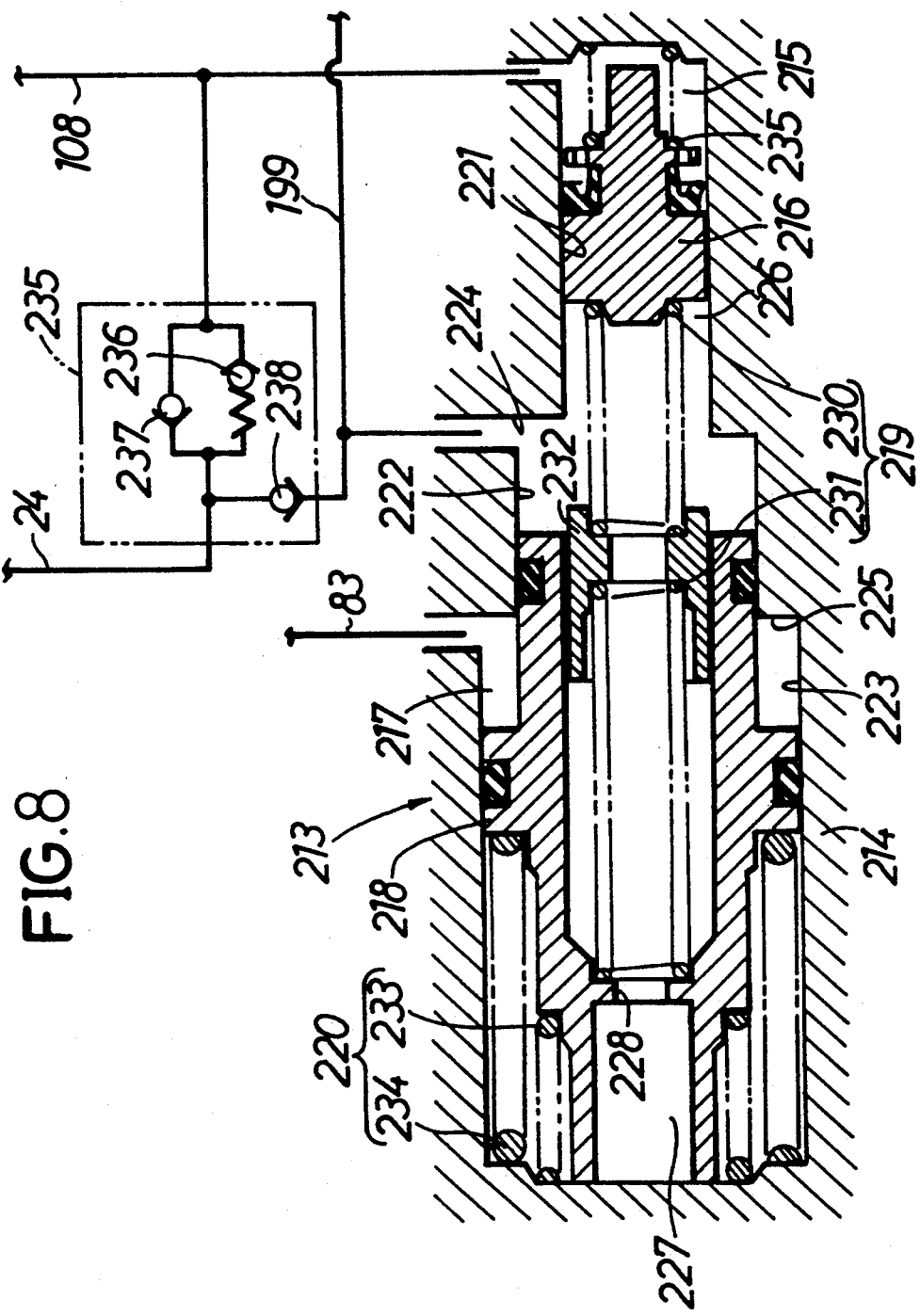
FIG. 8 is an illustration of a hydraulic circuit in a fluid pressure control system according to a second embodiment of the present invention.

FIG. 8 illustrates a stroke accumulator in a second embodiment of the present invention.

An accumulator piston 216 is slidably received in a casing 214 of this stroke accumulator 213 in order to define an accumulating chamber 215 leading to a passage 108 therebetween. A back-up piston 218 is also slidably received in the casing 214 to define therebetween a pilot chamber 217 communicating with a passage 83 leading to the fluid pressure supply source 3. The stroke accumulator 213 comprises a first biasing means 219 for resiliently biasing the accumulator piston 216 in a direction so as to reduce the volume of the accumulating chamber 215, and a second biasing means 220 having a larger load than that of the first biasing means for resiliently biasing the back-up piston 218 in a direction to reduce the volume of the pilot chamber 217.

The casing 214 is provided with a first cylinder bore 221 with one end closed; a second cylinder bore 222 which has larger diameter than that of the first cylinder bore 221 and which is coaxially connected at one end to the other end through a step 224; and a third cylinder bore 223 which has a larger diameter than that of the second cylinder bore 22 and which is coaxially connected at one end to the other end of the second cylinder bore 222 through a step 225 and closed at the other end. The accumulator piston 216 is slidably received in the first cylinder bore 221 so as to define the accumulating chamber 215 between the piston 216 and one end wall of the casing 214. The back-up piston 218 is slidably received in the second and third cylinder bores 222 and 223 so as to define a release chamber 226 between the back-up Piston 218 and the accumulator piston 216, wherein the release chamber 22b leads to the reservoir R through a passage 199. The pilot chamber 217 is defined between the step 224, as well as an inner surface of the third cylinder bore 223 and an outer surface of the back-up piston 218. Further, a spring chamber 227 is defined between the back-up piston 218 and the other end wall of the casing 214 in order to lead to the release chamber 226. A return spring 235 is contained in the accumulating chamber 215 for biasing the accumulator piston 216 in a direction in order to increase the volume of the accumulating chamber 215 with a small spring load.

The back-up piston 218 is formed into a cylindrical shape and has a radially inwardly projecting receiving collar 228 provided at an axially intermediate portion thereof.

The first biasing means 219 comprises a pair of coil springs 230 and 231 interposed in series between the accumulator piston 216 and the back-up piston 218 with a guide member 232 interposed between both the springs 230 and 231. One of the coil springs 230 is disposed between the accumulator piston 216 and the guide member 232; and the other coil spring 231 is disposed between the guide member 232 and the receiving collar 228 of the back-up piston 218. The coil springs 230 and 231 have different load characteristics which are set so that the spring load characteristic for biasing the accumulator piston 216 toward the accumulating chamber 215 is varied in the middle Of the movement of the accumulator piston 216 in a direction so as to increase the volume of the accumulating chamber 215.

The second biasing means 220 comprises a pair of parallel coil springs 233 and 234 contained in the spring chamber 227 and compressed between the back-up piston 218 and the other end wall of the casing 214. The spring load of the second biasing means 220 is set larger than the spring load of the first biasing means 219.

A flow communication restraining means 235 is provided between the passage 108 connected to the pressure chamber 93 in the auxiliary fluid pressure generating means 61 and the passage 24 leading to the valve chest 33 in the bypass valve 23 in each of the fluid pressure transfer units 4$_{FL}$, 4$_{FR}$ and 4$_R$, as well as the breathing passage 199 leading to the reservoir R. The flow communication restraining means 235 comprises a differential pressure regulating valve 236 which permits a flow of a working fluid from the passage 108 to the passage 24 when the fluid pressure in the passage 108 becomes larger than the fluid pressure in the passage 24 by a predetermined value or more; a cup seal 237 functioning as a one-way valve which permits a flow of the working fluid from the passage 24 to the passage 108 in response to the fluid pressure in the passage 24 becoming larger than that in the passage 108; and a cup seal 238 functioning as a one-way valve which permits a flow of the working fluid from the passage 199 leading to the reservoir R to the passage 24 when the passage 24 is depressurized.

The flow communication restraining means 235 has a function similar to those of the differential pressure regulating valve 136 and the cup seals 137 and 138 in the first embodiment.

The stroke accumulator 213, in a condition in which the fluid pressure supply source 3 is in normal operation so that a normal fluid pressure from the fluid pressure supply source 3 is applied to the pilot chamber 217, the back-up piston 218 is moved in a direction in order to increase the volume of the pilot chamber 217 (i.e., away from the accumulator piston 216 against the biasing force of the second biasing means 220), as shown in FIG. 8. However, when the operation of the fluid pressure supply source 3 malfunctions and causes the fluid pressure in the pilot chamber 217 to be abnormally reduced, the back-up piston 218 is moved in a direction to reduce the volume of the pilot chamber 217 (i.e., toward the accumulator piston 216 by the spring force of the second biasing means 220). Thus, the resilient force of the first biasing means 219 comprising the pair of coil springs 230 and 231 arranged in series is larger than that when the fluid pressure in the pilot chamber 217 is normal and the back-up piston 218 has been retreated.

Even with such a structural arrangement, an effect similar to that in the first embodiment is provided.

Figure 9:
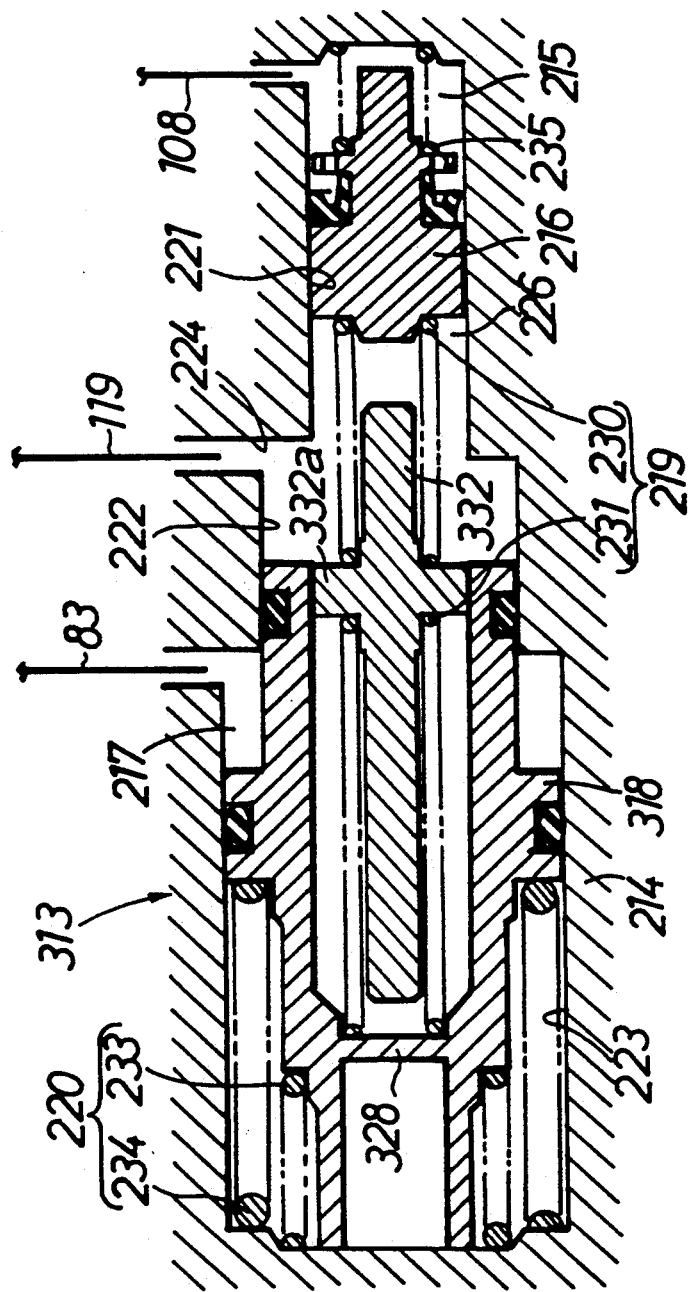
FIG. 9 is a longitudinal sectional view of a stroke accumulator in a modification of the second embodiment.

FIG. 9 illustrates a modification of the second embodiment.

In a stroke accumulator 313, a spacing restraining member 332 is disposed between an accumulator piston 216 and a back-up piston 318 and formed into a bar which is capable of abutting at a front end thereof against the accumulator piston 216 and at a rear end thereof against a receiving portion provided on the back-up piston 318. The spacing restraining member 332 has a radially outwardly projecting collar 332a provided at an intermediate portion thereof, and a pair of coil springs 230 and 231 forming a first biasing means 219 are disposed in series with the collar 332a interposed therebetween.

Moreover, the spacing restraining member 332 has a length which is set so that when the back-up piston 318 is advanced, the opposite ends of the spacing restraining member 332 abut against the pistons 216 and 318, respectively, before the back-up piston 318 reaches its advance limit.

In such a stroke accumulator 313, when the operation of the fluid pressure supply source 3 malfunctions and causes the fluid pressure in the pilot chamber 217 to be abnormally reduced, the back-up piston 318 is moved in a direction so as to reduce the volume of the pilot chamber 217 (i.e., toward the accumulator piston 216 by the spring force of the second biasing means 220), whereby both the pistons 216 and 318 are operatively connected to each other through the spacing restraining member 332. This permits the accumulator piston 216 to be biased in a direction to reduce the volume of the accumulating chamber 215 by the second biasing means 220 having the larger spring load than the spring load of the first biasing means 219. Thus, the resilient biasing force on the accumulator piston 216 is larger than that when the fluid pressure in the pilot chamber 217 is normal and the back-up piston 218 has been retreated. Therefore, wasteful consumption of the fluid pressure generated in the pressure chamber 93 in the stroke accumulator 313 is avoided. It is also possible to prevent the depression stroke of the brake pedal 1 from increasing more than necessary.

Figure 10:
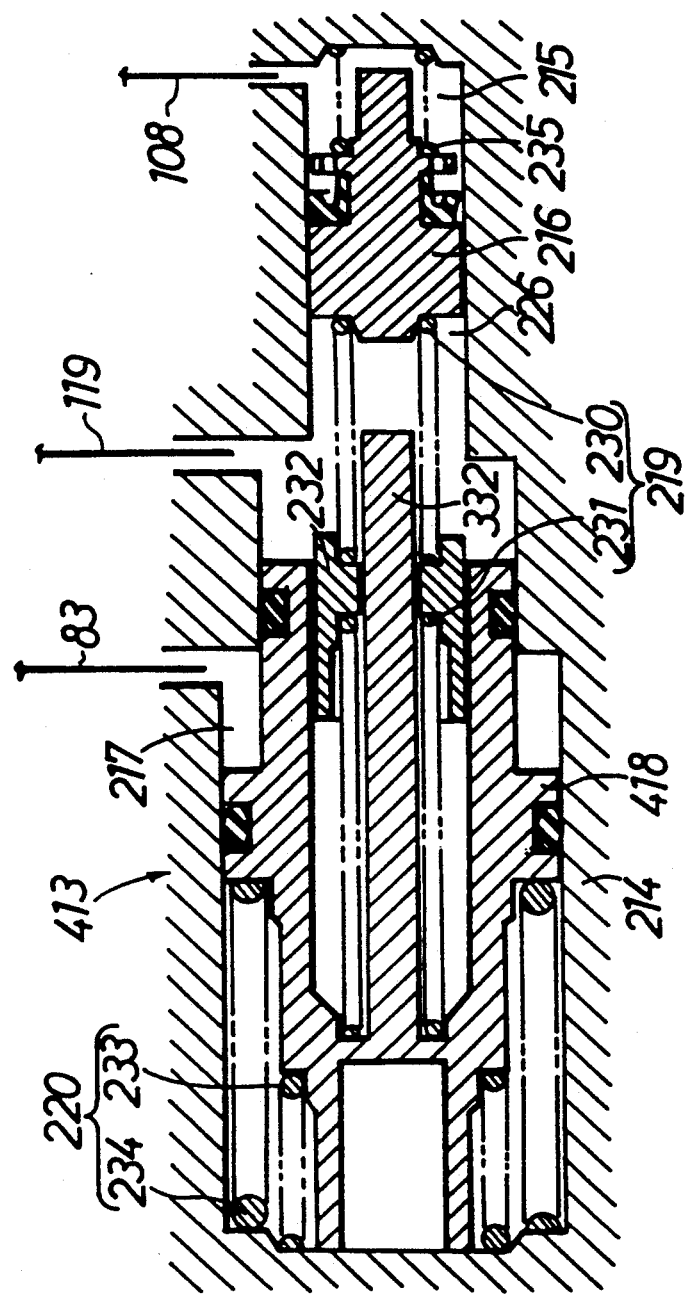
FIG. 10 is a longitudinal sectional view of a stroke accumulator in another modification of the second embodiment.

FIG. 10 illustrates another modification of the second embodiment.

In a stroke accumulator 413 in this modification, a bar-like restraining member 432 for restraining the minimum spacing between the accumulator piston 216 and a back-up piston 418 is integrally connected to the back-up piston 418 in order to abut against the accumulator piston 216 with the movement of the back-up piston 418 toward the accumulator piston 216.

Even in this modified embodiment, when the operation of the fluid pressure supply source 3 malfunctions and causes the fluid pressure in the pilot chamber 217 to be abnormally reduced, the back-up piston 418 is moved toward the accumulator 216 by the spring force of the second biasing means 220; whereby, both the pistons 216 and 418 are operatively connected to each other through the spacing restraining member 432. In this way, the resilient biasing force on the accumulator piston 216 can be increased larger than that when the fluid pressure in the pilot chamber 217 is normal and the back-up piston 418 has been retreated. Therefore, wasteful consumption of the fluid pressure generated in the pressure chamber 93 is wastefully consumed in the stroke accumulator 313 is avoided. It is also possible to prevent the depression stroke of the brake pedal 1 from increasing more than necessary.

Although the coil springs have been used as the first and second biasing means in the above-described second embodiment, a gas spring can also be used.

The present invention is widely applicable not only to a brake system for a vehicle wherein a boosted braking pressure is applied to each of the brake devices $B_{FL}$, $B_{FR}$, $B_{RL}$ and $B_{RR}$ in response to the depression of the brake pedal 1, but is also applicable to a fluid pressure control system in which the output pressure from a fluid pressure supply source capable of outputting a given fluid pressure can be adjusted and delivered in accordance with the operation amount of the operating member.

The above description is included to illustrate the operation of the preferred embodiments and is not meant to limit the scope of the invention. The scope of the invention is to be limited only by the following claims. From the above discussion, many variations are apparent to one skilled in the art which would yet be encompassed by the spirit and scope of the invention.

What is claimed is:

1. A fluid pressure control system, comprising:
    an operational reaction force generating means for reducing a volume of a pressure chamber in response to an operation of an operating member, said operational reaction force generating means having a piston which includes a front surface facing said pressure chamber and is operatively connected to said operating member;
    a fluid pressure control valve means for adjusting and outputting an output pressure from a fluid pressure supply source which outputs a constant fluid pressure in accordance with an amount in which said operating member operates; and
    a stroke accumulator connected to said pressure chamber,
    wherein said stroke accumulator comprises a casing, an accumulator piston slidably received in said casing so as to define an accumulating chamber leading to said pressure chamber between said accumulator piston and said casing, a back-up piston slidably received in said casing to define a pilot chamber leading to the fluid pressure supply source between said back-up piston and said casing such that a movement of the back-up piston in a direction to reduce a volume of the pilot chamber corresponds to a movement of the back-up piston toward the accumulator piston, a first biasing means for resiliently biasing the accumulator piston in a direction to reduce a volume of said accumulating chamber, and a second biasing means having a load larger than a load of said first biasing means for resiliently biasing said back-up piston in a direction so as to reduce the volume of said pilot chamber, and wherein the resilient biasing force acting on said accumulator piston by the movement of said back-up piston toward said accumulator piston with the abnormal reduction in fluid pressure in said pilot chamber is increased more than the resilient biasing force acting on said accumulator piston when the fluid pressure in said pilot chamber is normal.

2. A fluid pressure control system according to claim 1, wherein said first biasing means comprises a coil spring compressed between said accumulator piston and said back-up piston.

3. A fluid pressure control system according to claim 1, further including a spacing restraining member for restraining the minimum spacing between said accumulator piston and said back-up piston.

4. A fluid pressure control system according to claim 1, wherein said stroke accumulator further includes a retainer for retaining an end portion end of the back-up spring which is opposite from the back-up piston, the maximum spacing between said accumulator piston and said retainer being restrained by an arrangement which enables the engagement of said retainer with said accumulator piston, and the maximum spacing between said retainer and said back-up piston being restrained by an arrangement which enables the engagement of said accumulator piston with said back-up piston.

5. A fluid pressure control system according to claim 1, wherein said first biasing means includes a pair of coil springs interposed in series between said accumulator piston and said back-up piston with a guide member interposed between said pair of coil springs.

6. A fluid pressure control system according to claim 1, wherein said second biasing means includes a pair of parallel coil springs which are compressed between said back-up piston and an end wall of said casing.

7. A fluid pressure control system according to claim 1, wherein said restraining member is a bar-like restraining member, and is integrally connected to said back-up piston so as to abut against said accumulator piston with a movement of said back-up piston toward said accumulator piston.

* * * * *